US010090773B2

(12) United States Patent
Palle et al.

(10) Patent No.: US 10,090,773 B2
(45) Date of Patent: Oct. 2, 2018

(54) SYSTEM, APPARATUS AND METHOD FOR IMPROVING INPUT POWER QUALITY IN A MODULAR POWER INVERTER

(71) Applicant: TECO-Westinghouse Motor Company, Round Rock, TX (US)

(72) Inventors: Bhaskara Palle, Round Rock, TX (US); Ryan Edwards, Round Rock, TX (US); Randall Pipho, Leander, TX (US); Alex Skorcz, Cedar Park, TX (US); Enrique Ledezma, Austin, TX (US); Hossein Karimi, Austin, TX (US)

(73) Assignee: TECO-Westinghouse Motor Company, Round Rock, TX (US)

(*) Notice: Subject to any disclaimer, the term of this patent is extended or adjusted under 35 U.S.C. 154(b) by 0 days.

(21) Appl. No.: 15/084,571

(22) Filed: Mar. 30, 2016

(65) Prior Publication Data

US 2017/0288562 A1    Oct. 5, 2017

(51) Int. Cl.
*H02M 7/48* (2007.01)
*H02M 5/458* (2006.01)

(52) U.S. Cl.
CPC .................................. *H02M 5/458* (2013.01)

(58) Field of Classification Search
CPC ........ H02M 7/49; H02M 3/285; H02M 7/493; H02M 3/1584; H02M 3/3155; H02M 7/537; H02M 3/335; H02M 7/5387; H02M 7/53871; H02J 3/46; H02J 3/38; H02J 3/005; Y10T 307/453; Y10T 307/50; Y10T 307/549; Y10T 307/707
USPC ............ 363/40, 41, 65, 71, 72, 98, 131, 132
See application file for complete search history.

(56) References Cited

U.S. PATENT DOCUMENTS

| | | | | |
|---|---|---|---|---|
| 5,638,263 | A * | 6/1997 | Opal .................... | H02M 3/285 363/65 |
| 6,301,130 | B1 * | 10/2001 | Aiello ................... | H02M 7/49 363/37 |
| 7,830,681 | B2 | 11/2010 | Abolhassani et al. | |
| 8,130,501 | B2 | 3/2012 | Ledezma et al. | |
| 8,279,640 | B2 | 10/2012 | Abolhassani et al. | |
| 2010/0085789 | A1* | 4/2010 | Ulrich .............. | H02M 7/53875 363/132 |
| 2010/0142234 | A1* | 6/2010 | Abolhassani .......... | H02M 7/49 363/41 |
| 2012/0275202 | A1* | 11/2012 | Yamamoto ............. | H02M 1/32 363/71 |
| 2014/0293663 | A1 | 10/2014 | Ledezma et al. | |

* cited by examiner

*Primary Examiner* — Nguyen Tran
(74) *Attorney, Agent, or Firm* — Trop, Pruner & Hu, P.C.

(57) ABSTRACT

In one embodiment, a system includes a plurality of slices each having a transformer including a primary winding to couple to an input power source and a plurality of secondary windings each to couple to one of a plurality of power cells of the slice. Each of the power cells of a first slice may have an output that is phase rotated with respect to a correspondingly positioned power cell of a second slice.

19 Claims, 16 Drawing Sheets

SYSTEM, APPARATUS AND METHOD FOR IMPROVING INPUT POWER QUALITY IN A MODULAR POWER INVERTER

FIELD OF THE INVENTION

Embodiments generally relate to the field of medium voltage power converters, and more particularly to improving input harmonics in a modular converter.

BACKGROUND

Multi-level power converters (also referred to as inverters) have been gaining popularity, mainly due to improved power quality, lower switching losses, better electromagnetic compatibility, and higher voltage capability. One common multi-level inverter topology is a series H-bridge (CHB) inverter, in which multiple single-phase H-bridge inverters are connected in series. Since this topology has multiple series power conversion cells, voltage and power levels may be easily scaled. This topology requires isolated DC voltage sources for series connection of H-bridge inverters. A common practice is to use a single large transformer or multiple modular transformers to power the cells. Once concern with existing systems is the presence of input current and voltage harmonics that impact power quality.

SUMMARY OF THE INVENTION

In one aspect of the present invention, a system, which may be a modular cascaded H-bridge-based drive system, includes a plurality of slices. Each slice may have a transformer including a primary winding to couple to an input power source and a plurality of secondary windings each to couple to one of a plurality of power cells of the slice. In turn, each of the plurality of power cells of a first slice has an output that is phase rotated with respect to a correspondingly positioned power cell of a second slice.

The system may include a first phase output line having at least a first power cell of the first slice coupled in series to a second power cell of the second slice, where the second power cell of the second slice is not correspondingly positioned with the first power cell of the first slice. In some cases, the first phase output line has a third power cell of a third slice coupled in series to at least the second power cell of the second slice, where the third power cell of the third slice is not correspondingly positioned with the first power cell of the first slice and the second power cell of the second slice.

In another aspect, a drive system includes multiples slices and phase output lines. A first slice may have a first transformer, a first slice controller, and first, second, and third power cells, where the first power cell is to receive reference signals from the first slice controller at a first phase, the second power cell is to receive reference signals from the first slice controller at a second phase, and the third power cell is to receive reference signals from the first slice controller at a third phase. A second slice may have a second transformer, a second slice controller, and first, second, and third power cells, where the first power cell of the second slice is positioned in correspondence with the first power cell of the first slice, the second power cell of the second slice is positioned in correspondence with the second power cell of the first slice, and the third power cell of the second slice is positioned in correspondence with the third power cell of the first slice. In turn, the first power cell of the second slice is to receive reference signals from the second slice controller at the second phase, the second power cell of the second slice is to receive reference signals from the second slice controller at the third phase, and the third power cell of the second slice is to receive reference signals from the second slice controller at the first phase. The phase output lines may couple the power cells of the slices to a load.

In another aspect, a method includes: receiving first reference signals from a first controller of a drive system in a first slice controller of a first slice having a first transformer and first, second, and third power cells, generating first, second and third pulse width modulation (PWM) reference signals therefrom, and providing the first PWM reference signal to the first power cell at a first phase, providing the second PWM reference signal to the second power cell at a second phase, and providing the third PWM reference signal to the third power cell at a third phase; receiving second reference signals from the first controller in a second slice controller of a second slice having a second transformer and first, second, and third power cells, generating first, second and third PWM reference signals therefrom, and providing the first PWM reference signal to the first power cell of the second slice at the second phase, providing the second PWM reference signal to the second power cell of the second slice at the third phase, and providing the third PWM signal to the third power cell of the second slice at the first phase, where the first power cell of the second slice is positioned in correspondence with the first power cell of the first slice, the second power cell of the second slice is positioned in correspondence with the second power cell of the first slice, and the third power cell of the second slice is positioned in correspondence with the third power cell of the first slice. The method further includes: coupling, via a first phase output line, the first power cell of the first slice and the third power cell of the second slice to a load; coupling via a second phase output line, the second power cell of the first slice and the first power cell of the second slice to the load; and coupling, via a third phase output line, the third power cell of the first slice and the second power cell of the second slice to the load.

DETAILED DESCRIPTION

In various embodiments, a modular cascaded power conversion system may be configured and controlled in a manner to reduce or remove input harmonics (e.g. current and/or voltage harmonics). Such harmonics may reflect back to an input side of power conversion modules of the system in a manner that can impact power quality by the reflection of these harmonics to an input transformer coupled to the power conversion modules. As will be described further herein, in particular embodiments, individual power conversion modules may be controlled in a phase rotating manner to enable a reduction in input harmonics. Embodiments may be applicable to a wide variety of power conversion systems, including non-regenerative, partial regenerative, and fully regenerative systems.

Figure 1A:
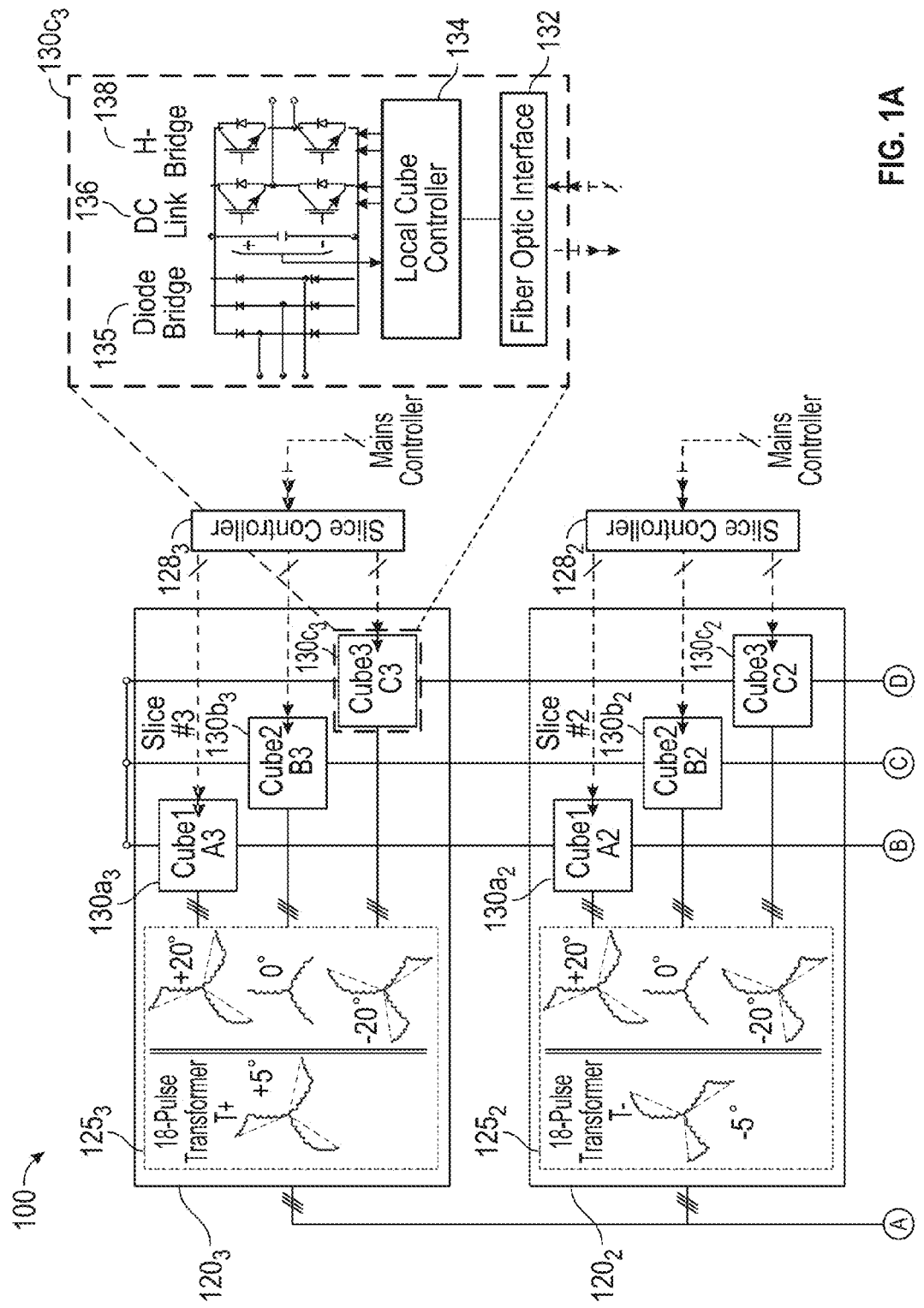
FIGS. 1A and 1B are schematic diagrams of a modular cascaded inverter.
Figure 1B:
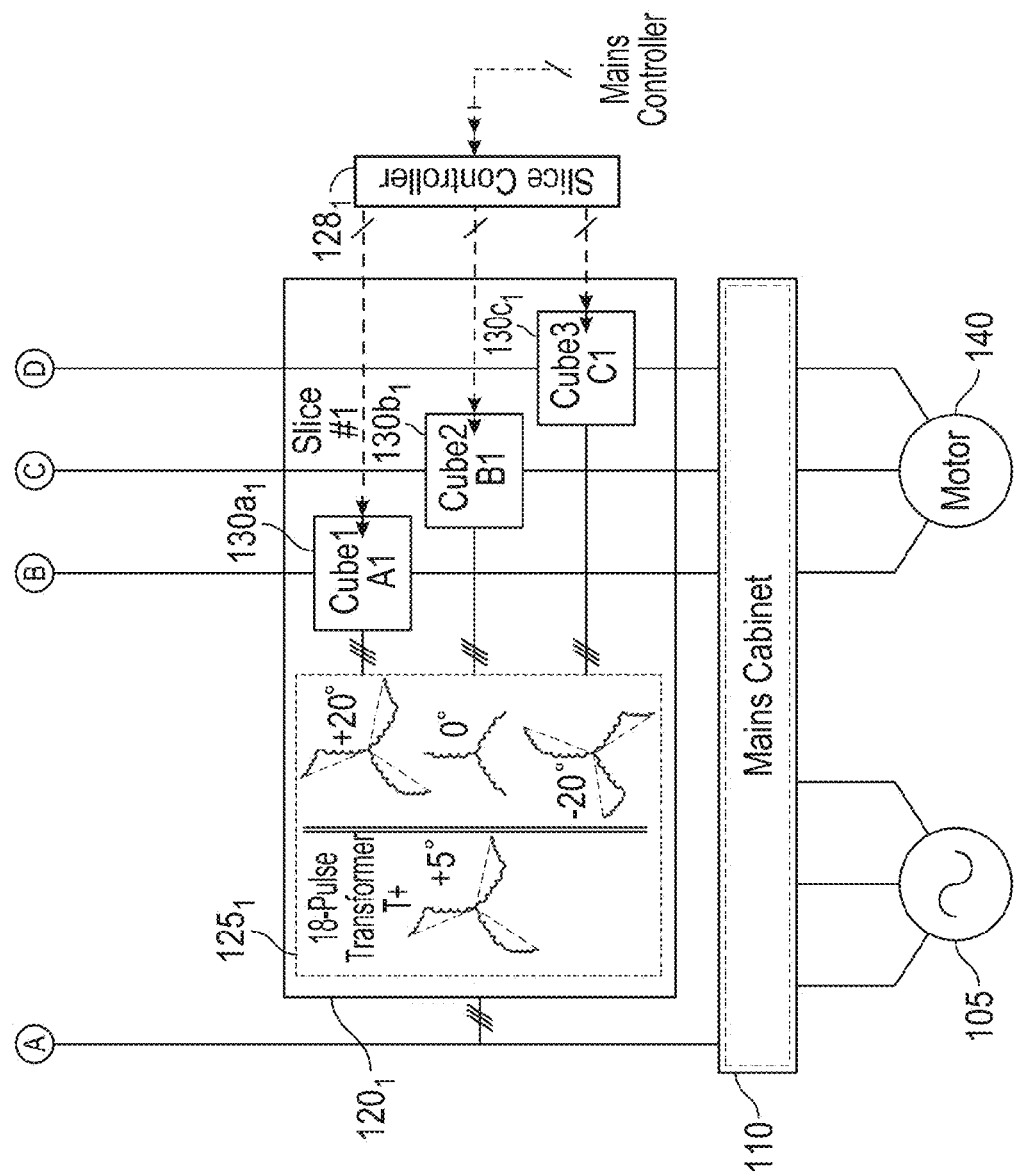

Referring now to FIGS. 1A and 1B, shown are schematic diagrams of a modular cascaded power converter 100 (also referred to as a drive or inverter). In the example shown in FIGS. 1A and 1B, power converter 100 is a non-regenerative power conversion system. As shown, inverter 100 includes multiple modular units that can be configured in one or more equipment cabinets. Inverter 100 is configured to receive incoming three-phase power from an input utility 105 and condition the power to output corresponding three-phase power to a motor 140. As seen, the incoming power is provided through a mains cabinet 110 as three-phase power that is provided to each of multiple so-called slices $120_1$-$120_3$. As seen, each slice 120 (generically) includes a corresponding transformer $125_1$-$125_3$ and multiple power cells or cubes $130_{A1}$-$130_{C3}$. Different modular arrangements of power cells and transformers can be realized, for example, as described in U.S. Pat. No. 7,830,681; U.S. Pat. No. 8,130,501; and U.S. Pat. No. 8,279,640, the disclosures of which are hereby incorporated by reference. As examples, a given slice 120 may be configured as a horizontal or vertical arrangement of power cells within a cabinet (also including the corresponding transformer). As one example, a transformer may be positioned in a transformer bay of a cabinet (e.g., at a bottom portion of the cabinet) and the three power cells of the slice positioned vertically above the transformer (e.g., each adapted on a different shelf or other support structure of the cabinet).

In the arrangement shown, each transformer 125 is an 18-pulse transformer having a phase-shifted primary winding and multiple phase-shifted secondary windings, each to provide three-phase power to a corresponding cube 130. More specifically, transformers 125 shown in FIGS. 1A and 1B are WYE-based transformers. However, understand other transformer types are possible in other examples.

Each cube 130, as shown with example $130_{C3}$ in the inset in FIG. 1A, includes a diode bridge 135, a DC link 136, and an inverter 138. In the embodiment shown, inverter 138 is implemented as an H-bridge inverter, and may be implemented using insulated gate bipolar transistors (IGBTs). As seen, control of inverter 138 may be by way of a local cube controller 134 that in turn communicates with a corresponding slice controller 128 that provides control signals in the form of voltage reference signals to the cell via a corresponding fiber optic interface 132. In turn, slice controller 128 may be in communication with, and receive control signals from, a mains controller within mains cabinet 110. Thus as seen, each cube 130 includes a three-phase diode bridge 135 that acts as a rectifier, DC-link capacitor, and a single-single phase H-bridge inverter. As such, each cube 130 is configured to output a single phase output. To this end, each cube receives voltage reference signals from slice controller 128. In the example of FIGS. 1A and 1B, where each cell or cube 130 of a slice is associated with a different phase, these reference signals may be sent to each cube 130 in a different phase (e.g., at 0°, 120°, and 240°, respectively corresponding to phases A, B and C).

With further reference to FIGS. 1A and 1B, note that the given cubes of a corresponding phase (e.g., cubes $130_{A1}$-$130_{A3}$, namely Cubes 1 of Phase A) are connected in series (or alternately in parallel) via a given phase output line to scale voltage or current output. As such, each of three phases of power is output by slices 120 to motor 140.

More specifically as shown in FIGS. 1A and 1B, slice controllers $128_1$-$128_3$ may provide reference signals to corresponding cubes $130_{A1}$-$130_{A3}$ (Cubes 1) with zero phase shift to form a phase output line of a first phase (e.g., phase A having a 0° phase shift). Similarly, slice controllers 128 may provide reference signals to corresponding cubes $130_{B1}$-$130_{B3}$ (Cubes 2) with a 120° phase shift to form a phase output line of a second phase (e.g., phase B having a 120° phase shift). And, slice controllers 128 may provide reference signals to corresponding cubes $130_{C1}$-$130_{C3}$ (Cubes 3) with a 240° phase shift to form a phase output line of a third phase (e.g., phase C having a 240° phase shift).

In operation of a system as in FIGS. 1A and 1B above, a mains controller creates an output voltage reference and sends the reference signal to each slice controller 128 based on the location of the slice unit in the series lineup. Slice controller 128 then creates three-phase output voltage references and transmits such reference signals to each power cube 130. 'Cube1' in each slice 120 is connected in series to create output phase A voltage (sum of outputs of power cells $130_{A1}$, $130_{A2}$, and $130_{A3}$), 'Cube2' in each slice 120 is connected in series to create output phase B voltage, and 'Cube3' in each slice 120 is connected in series to create output phase C voltage. In an embodiment, a mains controller transmits three phase sinusoidal waveform reference signals to each slice controller 128. The reference signals are calculated based on number of slices. For example, in a 3-slice series-connected system in FIGS. 1A and 1B, to generate 2400V output voltage, the mains controller transmits reference signals to command each slice to generate 800V. The slice controller then uses a space vector pulse width modulation (PWM) method to create PWM signals for three H-bridge inverters of power cubes 130. More specifically, the slice controller transmits Phase A PWM signals to Cube1 (cube $130_{A1}$), Phase B PWM signals to Cube2 (cube $130_{B1}$) and Phase C PWM signals to Cube3 (cube $130_{C1}$).

Of course in different examples, each of these phase output lines may be associated with a different phase value. Nonetheless, note that in FIGS. 1A and 1B, each of the phase output lines is realized by series connection of corresponding power cubes of the different slices positioned in correspondence with each other. As such, these correspondingly positioned power cells (e.g., cubes $130_{A1}$-$130_{A3}$) may be interconnected by cabling to provide a series output of a given phase to motor 140. Understand that in different embodiments, this corresponding positioning of power cells 130 may be horizontal or vertical.

Figure 2A:
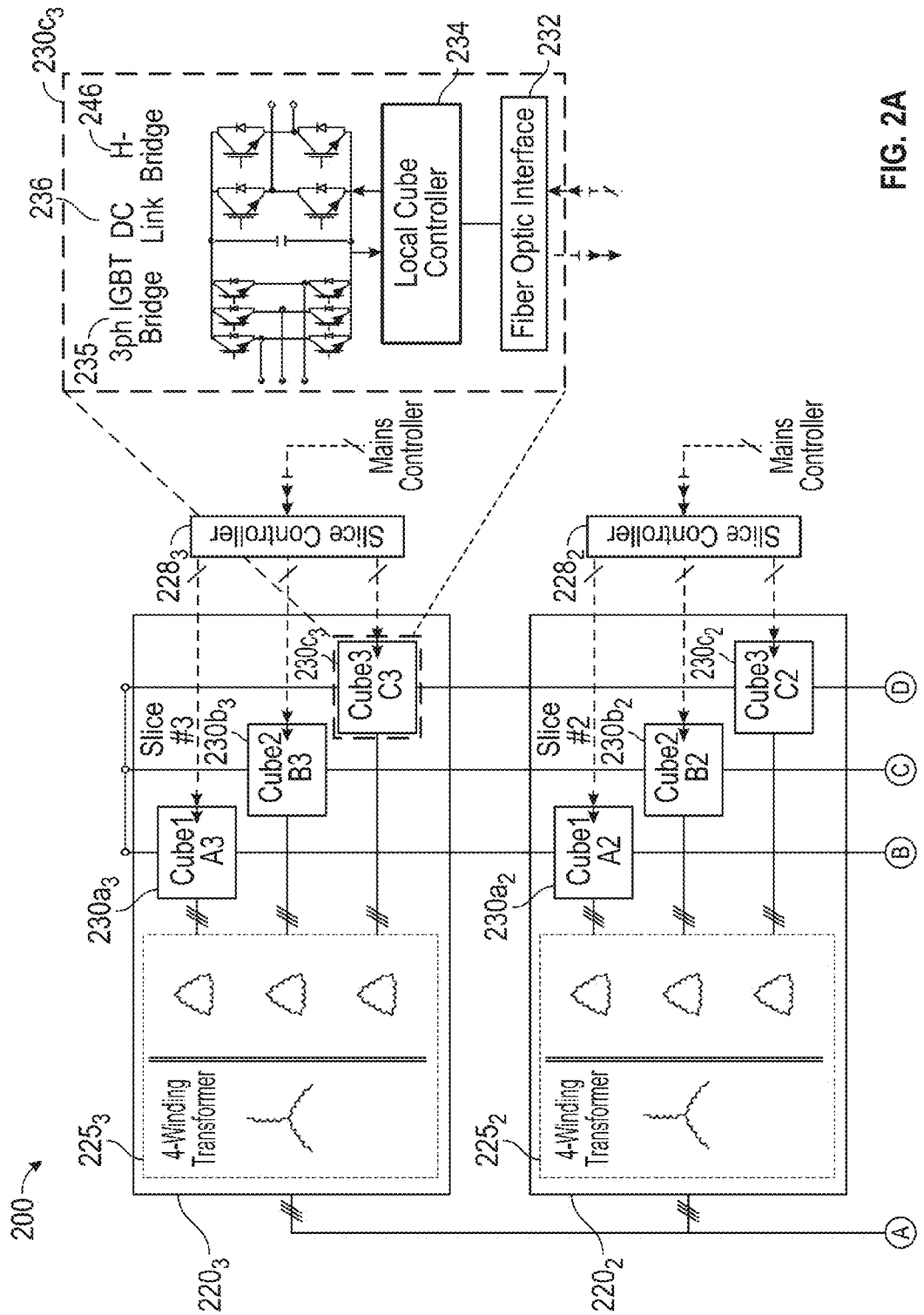
FIGS. 2A and 2B are schematic diagrams of another modular cascaded inverter.
Figure 2B:
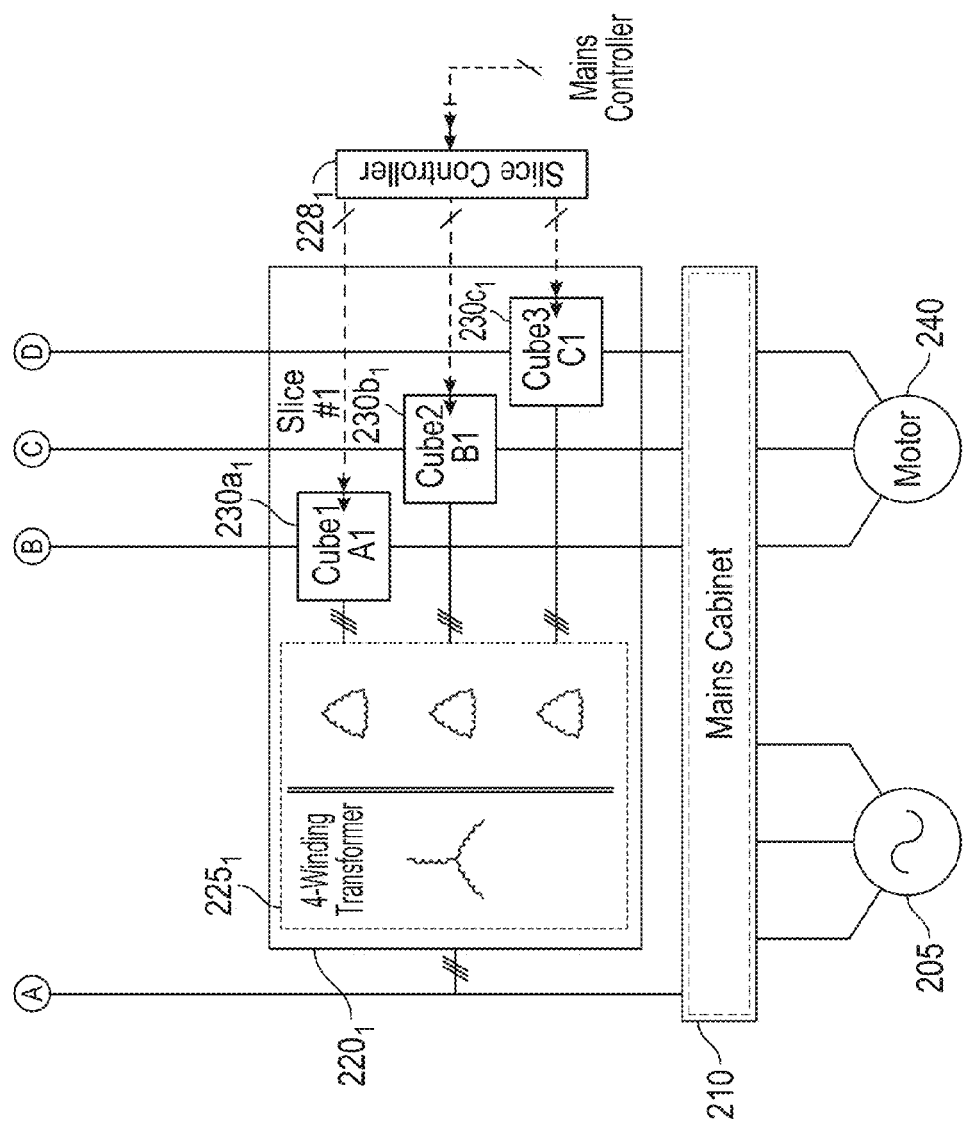

Referring now to FIGS. 2A and 2B, shown are schematic diagrams of a regenerative modular cascaded power converter 200. As above, inverter 200 includes multiple modular units that can be configured in one or more equipment cabinets, to receive incoming three-phase power from an input utility 205 and condition the power to output corresponding three-phase power to a motor/generator 240. As seen, the incoming power is provided through a mains cabinet 220 as three-phase power that is provided to each of slices $220_1$-$220_3$. As seen, each slice 220 (generically) includes a corresponding transformer $225_1$-$225_3$ and multiple power cells or cubes $230_{A1}$-$230_{C3}$.

In the arrangement shown, each transformer 225 is a 4-winding transformer having a WYE (non-phase shifted) primary winding and multiple secondary windings (of a delta winding), each to provide three-phase power to a corresponding cube 230. Understand other transformer types are possible in other examples.

Each cube 230, as shown with example $230_{C3}$ in the inset in FIG. 2A, includes an active front end 235 formed as a three-phase IGBT bridge, a DC link 236, and an inverter 238. Control of front end 235 and inverter 238 may be by way of a local cube controller 234 that in turn communicates with a corresponding slice controller 228 that provides control signals in the form of voltage reference signals to the cell via a corresponding fiber optic interface 232. In turn, slice controller 228 may be in communication with, and receive control signals from, a mains controller within mains cabinet 220. As in the embodiment of FIGS. 1A and 1B, each cube 230 of a slice is associated with a different phase, and thus the reference signals may be sent to each cube 230 in a different phase (e.g., at 0°, 120°, and 240°, respectively corresponding to phases A, B and C).

With further reference to FIGS. 2A and 2B, note that the given cubes of a corresponding phase (e.g., cubes $230_{A1}$-$230_{A3}$) are connected in series (or alternately in parallel) via a given phase output line to scale voltage or current output. As such, each of three phases of power is output by slices 220 to motor/generator 240 (or regenerative power received from motor/generator 240).

As such, slice controllers 228 may provide reference signals to corresponding cubes $230_{A1}$-$230_{A3}$ with zero phase shift to form a phase output line of a first phase (e.g., phase A having a 0° phase shift). Similarly, slice controllers 228 may provide reference signals to corresponding cubes $230_{B1}$-$230_{B3}$ with a 120° phase shift to form a phase output line of a second phase (e.g., phase B having a 120° phase shift). And, slice controllers 228 may provide reference signals to corresponding cubes $230_{C1}$-$230_{C3}$ with a −120° phase shift to form a phase output line of a second phase (e.g., phase C having a 240° phase shift).

In the non-regenerative type system shown in FIGS. 1A and 1B, transformers 120 have phase-shifted windings and the input stage of cubes 130 is a three-phase diode rectifier 135. Transformers 230 of regenerative system 200 do not have phase-shifted windings and the input stage of cubes 230 is a three-phase active IGBT rectifier 235.

Understand that the above configurations of FIGS. 1A-1B and FIGS. 2A-2B are of particular topologies, and that variations are of course possible. These topologies described above are adapted such that each power cell or cube receives constant three-phase voltage from the transformer secondary windings. The three-phase voltage is converted into a single-phase variable voltage/frequency output. During this conversion process, second-order harmonic currents can be generated in the DC link due to single-phase loading of the H-bridge inverter. The second-order DC link harmonics appears as lower order harmonic and inter-harmonic currents in the input side of the CHB inverter, causing power quality issues.

Figure 3:
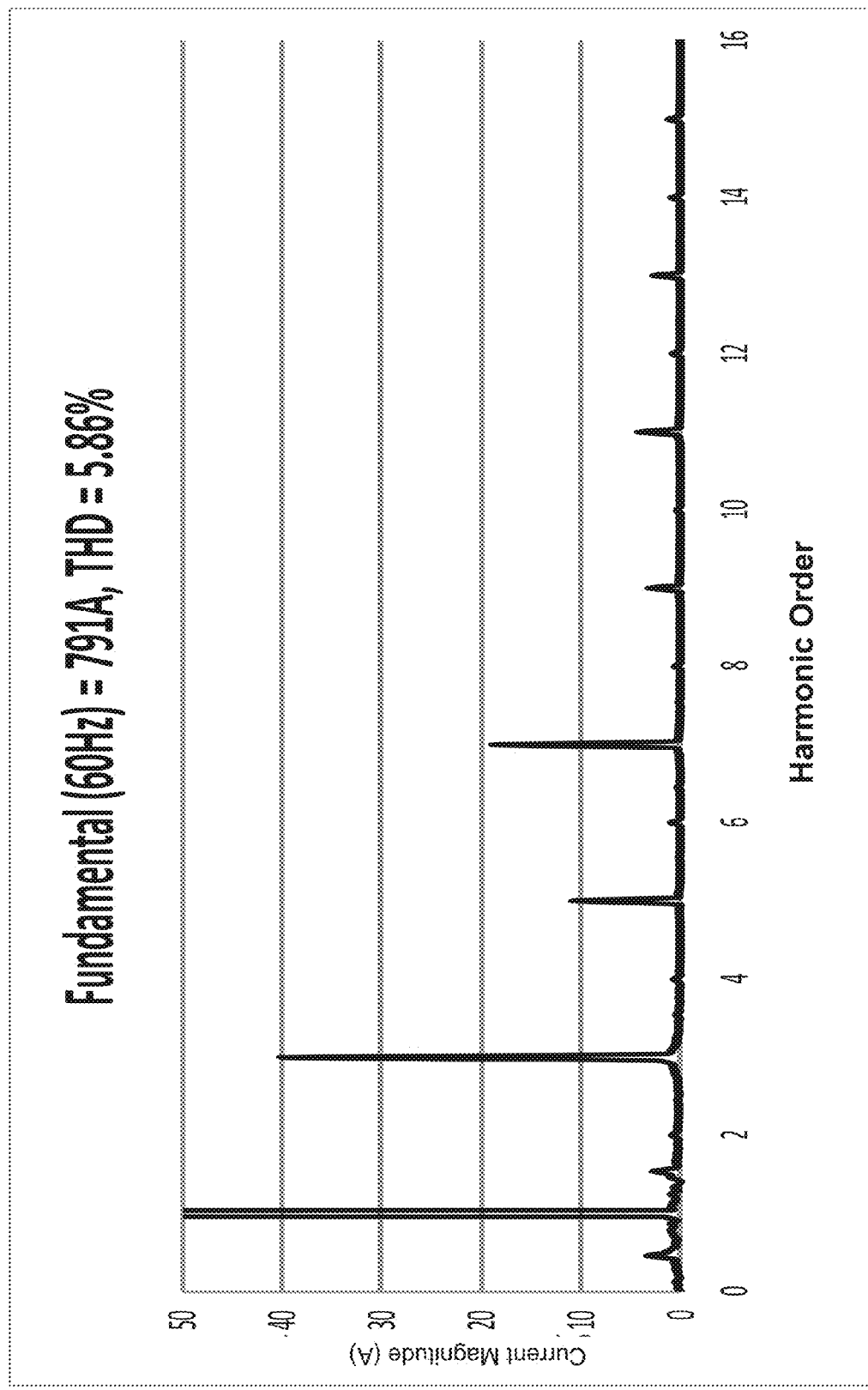
FIG. 3 is a graphical illustration of harmonic distortion in an inverter.

FIG. 3 shows a fast Fourier transform (FFT) plot of an input current of a representative 5000 HP CHB inverter. As seen, the input supply frequency and output drive frequency is 60 Hz. Significant third harmonic component and other harmonics are present in input current. As such, input current total harmonic distortion (THD) of the system can exceed the recommended harmonic content levels, per IEEE 519-2014 standard. As mentioned previously, the single-phase loading of H-bridge inverter creates lower order harmonic and inter-harmonic currents. Harmonic currents created by the 'Phase A' or 'Cube1' cubes sums up at the input of the CHB inverter without any cancellation. Similarly harmonic currents created by 'Cube2' and 'Cube3' cubes sum up without any cancellation.

Figure 4A:
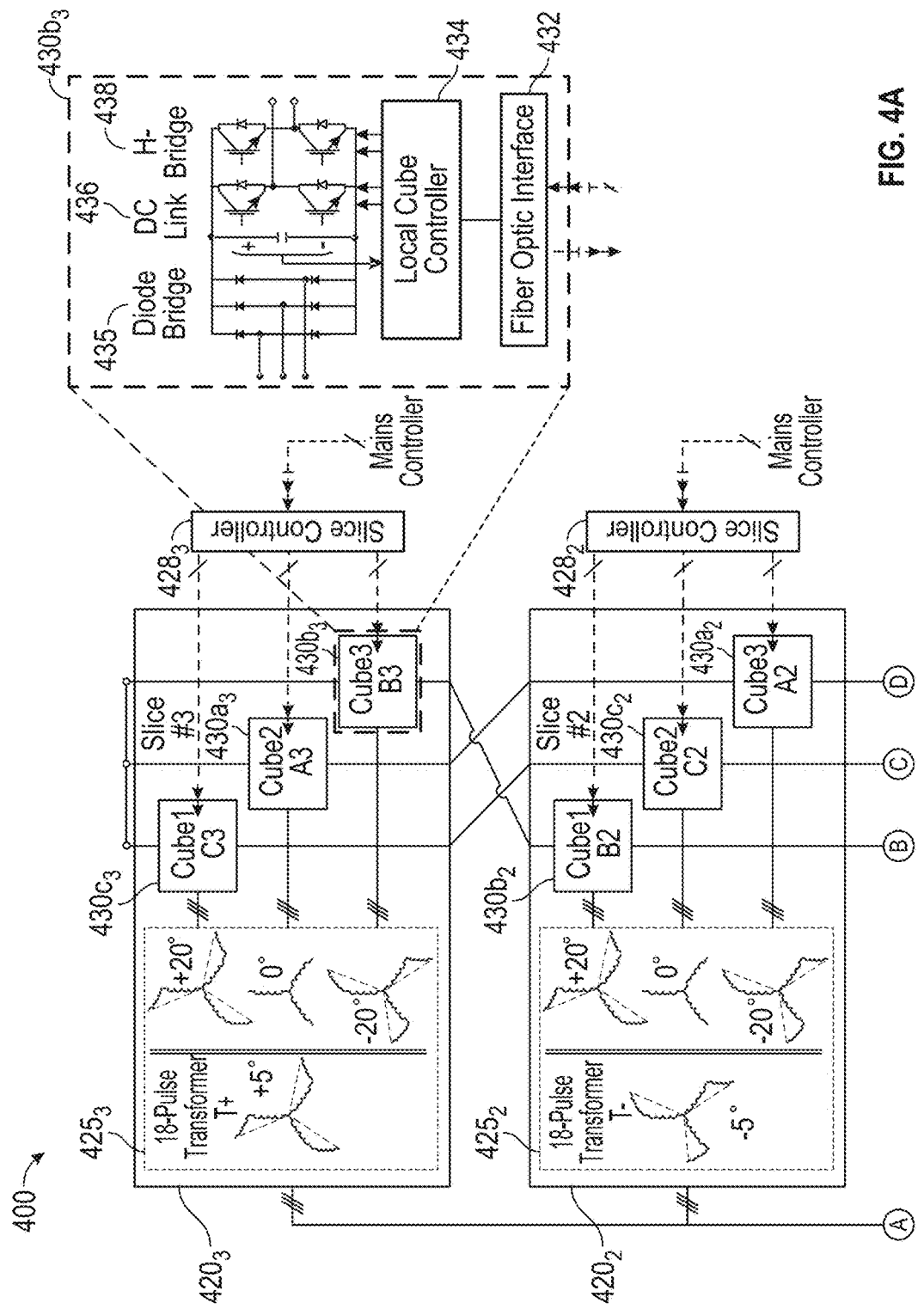
FIGS. 4A and 4B are schematic diagrams of a modular cascaded inverter in accordance with one embodiment of the present invention.
Figure 4B:
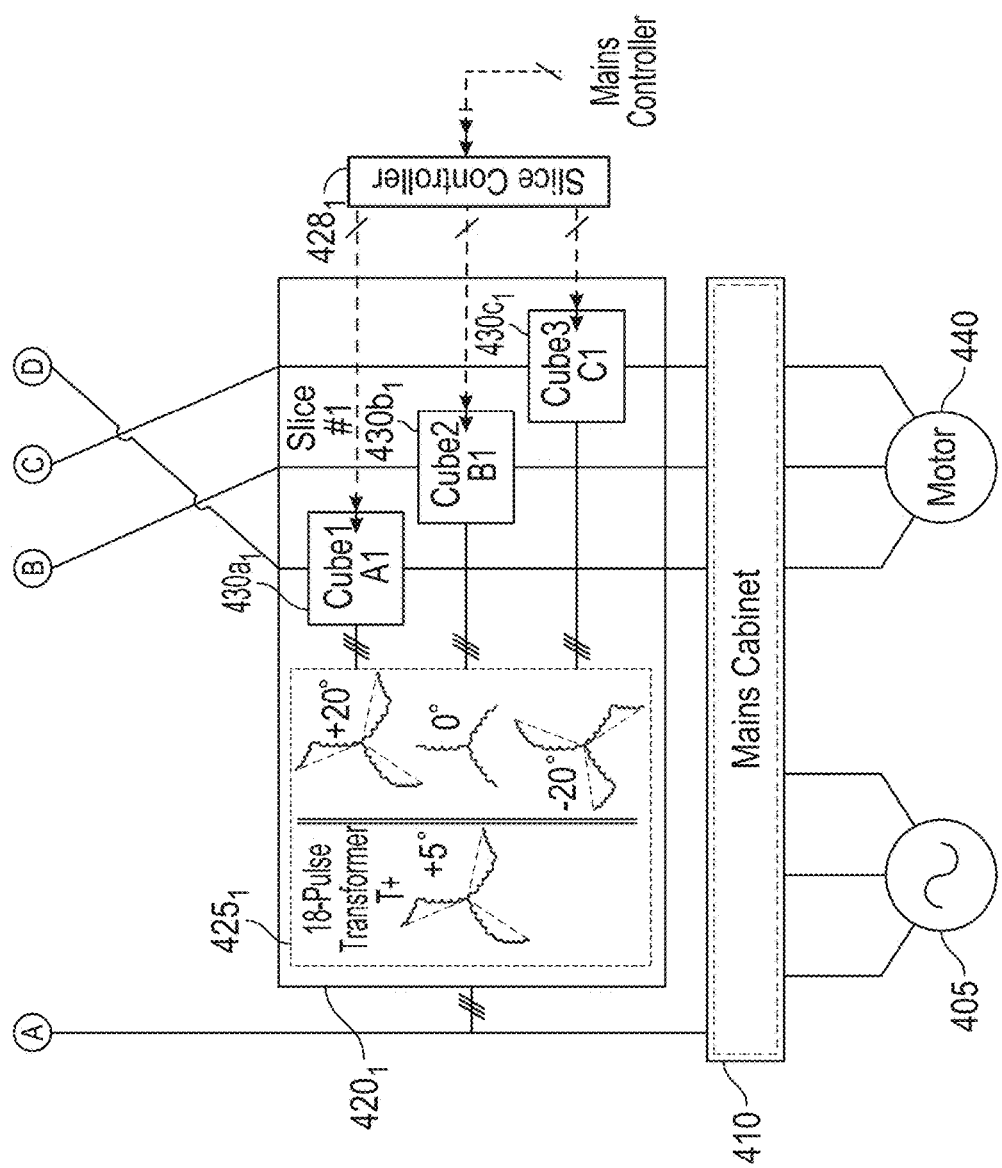

Embodiments described herein may enable reduction of input harmonic content. In the embodiment of FIGS. 4A and 4B, an inverter 400 is configured in a modular arrangement with output phase voltage outputs from the corresponding cubes of each slice to occur in a manner to cancel the harmonics created by single-phase loading from the H-bridge inverters.

Referring now to FIGS. 4A and 4B, shown are schematic diagrams of a modular cascaded power converter 400 in accordance with an embodiment. By the connections and controls of system 400, phase rotation of control signals to the cubes creates a corresponding phase shift between harmonic currents at the input transformers, which sum to effectively cancel each other to improve input side power quality.

Inverter 400 includes multiple modular units that can be configured in one or more equipment cabinets, to receive incoming three-phase power from an input utility 405 and condition the power to output corresponding three-phase power to a motor 440. As seen, the incoming power is provided through a mains cabinet 410 as three-phase power that is provided to each of slices $420_1$-$420_3$. As seen, each slice 420 (generically) includes a corresponding transformer $425_1$-$425_3$ and multiple power cells or cubes $430_{A1}$-$430_{C3}$. In the arrangement shown, each transformer 425 is an 18-pulse transformer having a phase-shifted primary winding and multiple phase-shifted secondary windings, each to provide three-phase power to a corresponding cube 410.

Each cube 430, as shown with example $430_{B3}$ in the inset in FIG. 4A, includes a diode bridge 435, a DC link 436, and an inverter 438. Control of inverter 438 may be by way of a local cube controller 434 that in turn communicates with a corresponding slice controller 428 that provides control signals in the form of voltage reference signals to the cell via a corresponding fiber optic interface 432. In turn, slice controller 428 may be in communication with, and receive control signals from, a mains controller within mains cabinet 410.

In contrast to the arrangement in FIGS. 1A and 1B, system 400 of FIGS. 4A and 4B is configured for phase-rotated control of power cubes 430 (which phase rotation may be performed by slice controllers 428). In this regard, slice controllers 428 may be configured to receive incoming reference signals from a mains controller and modify the phase control of these signals to cause a corresponding phase rotation in the reference signals provided to the cubes 430. In this way, correspondingly positioned power cells (e.g., power cells $430_{A1}$, $430_{B2}$, and $430_{C3}$, namely Cubes 1) do not couple together in series connection and rather output voltages at different phases, in contrast to the arrangement of FIGS. 1A and 1B. As such, the phase output lines of FIGS. 4A and 4B are implemented with phase rotation between the slices to enable provision of three phases of power to motor 440, with improved input power quality.

More specifically as shown in FIGS. 4A and 4B, slice controllers 428 may provide reference signals to corresponding cubes $430_{A1}$-$430_{A3}$ (Cube 1, Cube 3, and Cube 2, respectively) with zero phase shift to form a phase output line of a first phase (e.g., phase A having a 0° phase shift). Similarly, slice controllers 428 may provide reference signals to corresponding cubes $430_{B1}$-$430_{B3}$ (Cube 2, Cube 1, Cube 3, respectively) with a 120° phase shift to form a phase output line of a second phase (e.g., phase B having a 120° phase shift). And, slice controllers 428 may provide reference signals to corresponding cubes $430_{C1}$-$430_{C3}$ (Cube 3, Cube 2, and Cube 1, respectively) with a 240° phase shift to form a phase output line of a third phase (e.g., phase C having a 240° phase shift). Note that communication of reference signals from slice controllers 428 to power cells 430 may be via fiber optic, and the electrical rotation may be software controlled as determined by slice order, identification number or similar techniques.

In the embodiment of FIGS. 4A and 4B, each slice controller 428 is assigned an identification number based on its location in the system. For example, second slice controller $428_2$ is assigned an ID of 2. After implementing the space vector PWM method, each slice controller 428 rotates PWM signals to cubes of its slice based on its identification number. The rotation in FIGS. 4A and 4B is implemented as shown in the conditional structure below in Table 1.

TABLE 1

```
IF (Slice ID = 2, 5, 8, 11 . . . )
    PWM A → Cube3
    PWM B → Cube1
    PWM C → Cube2
ELSE IF (Slice ID = 3, 6, 9, 12 . . . )
    PWM A → Cube2
    PWM B → Cube3
    PWM C → Cube1
ELSE
    PWM A → Cube1
    PWM B → Cube2
    PWM C → Cube3
```

Of course in different examples, each of these phase output lines may be associated with different phase values. Nonetheless, in FIGS. 4A and 4B, each of the phase output lines is realized by series connection of differently positioned power cubes of the different slices positioned out of correspondence with each other. As such, the correspondingly positioned power cells (e.g., cubes $430_{A1}$, $430_{B2}$, and $430_{C3}$) are of different phase output lines and may be phase rotated 120° with respect to the correspondingly positioned cube of the adjacent slice(s). Note that the physical connections of cables is different in FIGS. 1A and 1B and FIGS. 4A and 4B. In both sets of Figures, Cube A1 is connected to Cube A2 and Cube A2 is connected to Cube A3. However, as Cube references are rotated in FIGS. 4A and 4B, the connections are rotated as well so that Cubes that belong to the same phase are connected in series with each other.

Thus in the embodiment of FIGS. 4A and 4B, a given slice controller 428 rotates or phase shifts the output phase voltage reference signal to cubes 430 by 120° with respect to its adjacent slice(s) 420. That is 'Cube1' ($430_{A1}$) in slice $420_1$ is a phase A cube, 'Cube1' in Slice $420_2$ is a phase B cube, 'Cube1' in slice $420_3$ is a phase C cube, and so on. This creates a 120° phase shift between the harmonic currents created by Cube1 in each slice. The phase-shifted harmonics sum up to cancel each other, improving the input side power quality.

Understand that a modular topology having multiple transformer units as described herein makes this technique possible. It can also be seen that from FIGS. 4A and 4B that the modular design of the CHB inverter system is conserved. The output of 'Cube1' in each slice is connected to output of 'Cube3' of the next slice; the output of 'Cube2' is connected to output of 'Cube1' and so on.

Figure 4C:
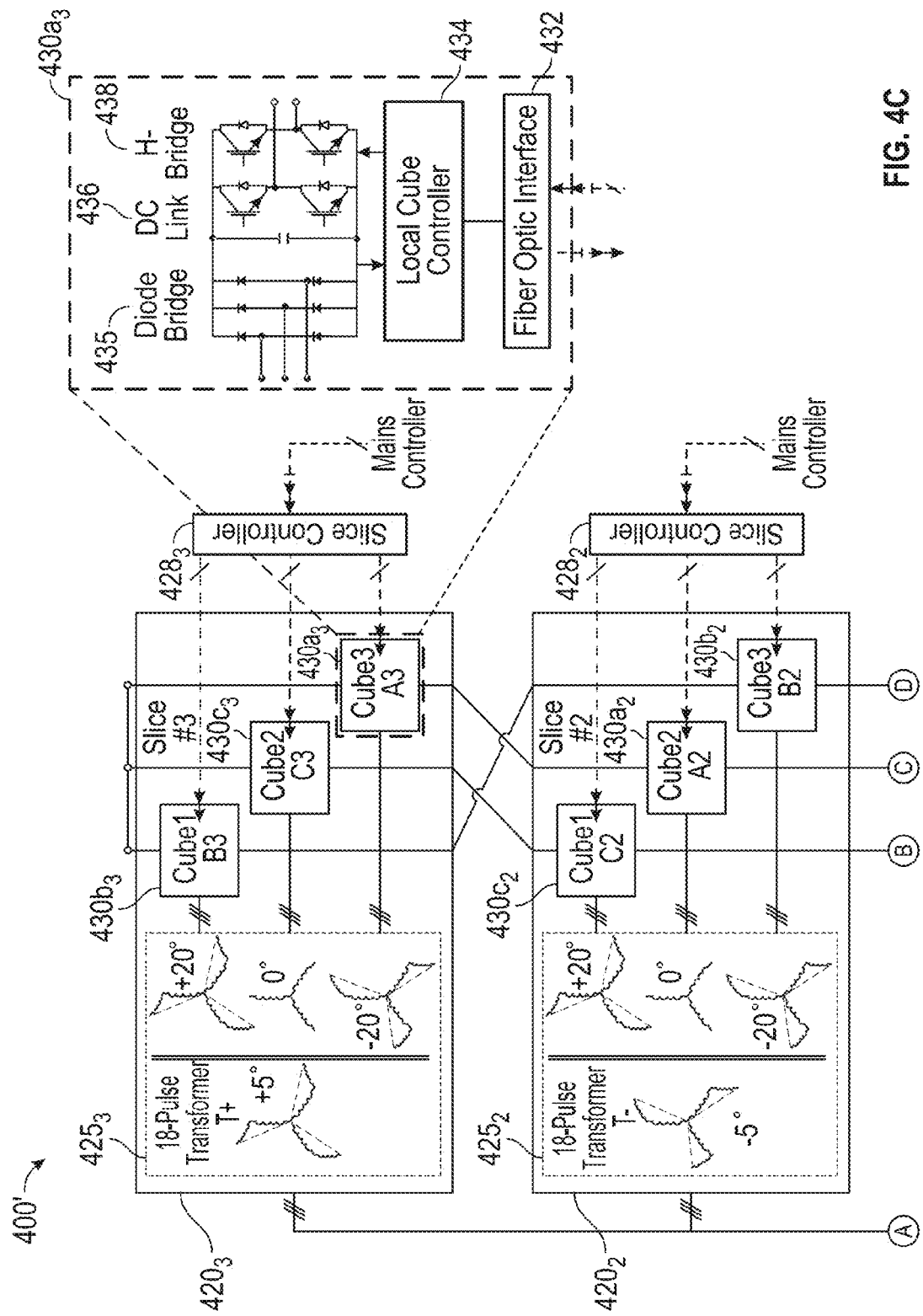
FIGS. 4C and 4D are schematic diagrams of a modular cascaded inverter in accordance with another embodiment of the present invention.
Figure 4D:
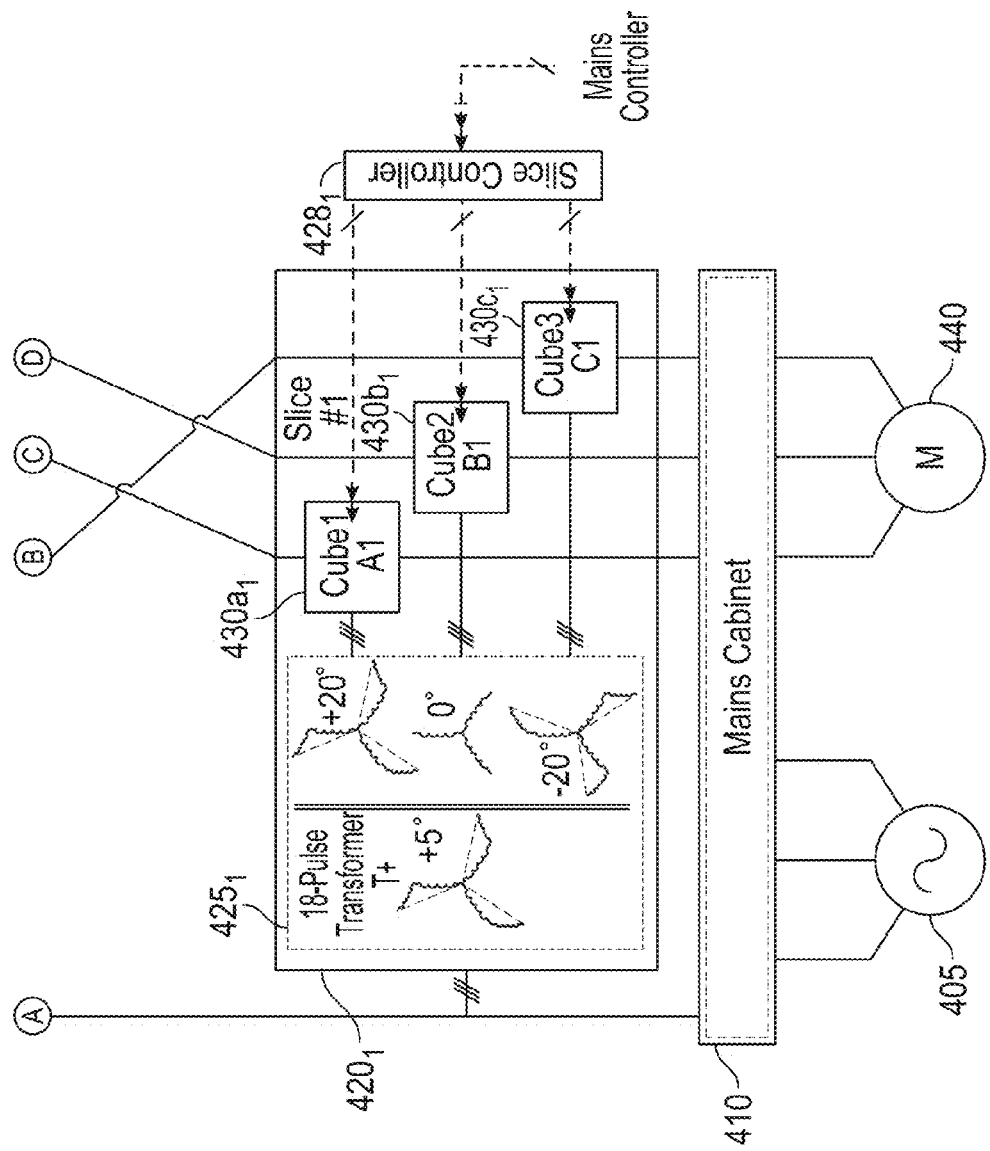

An alternative equivalent arrangement of Cubes with phase rotation is shown in FIGS. 4C and 4D for another CHB inverter 400'. For the alternative equivalent arrangement presented in FIGS. 4C and 4D, the two conditional IF statements of Table 1 are switched.

Figure 5A:
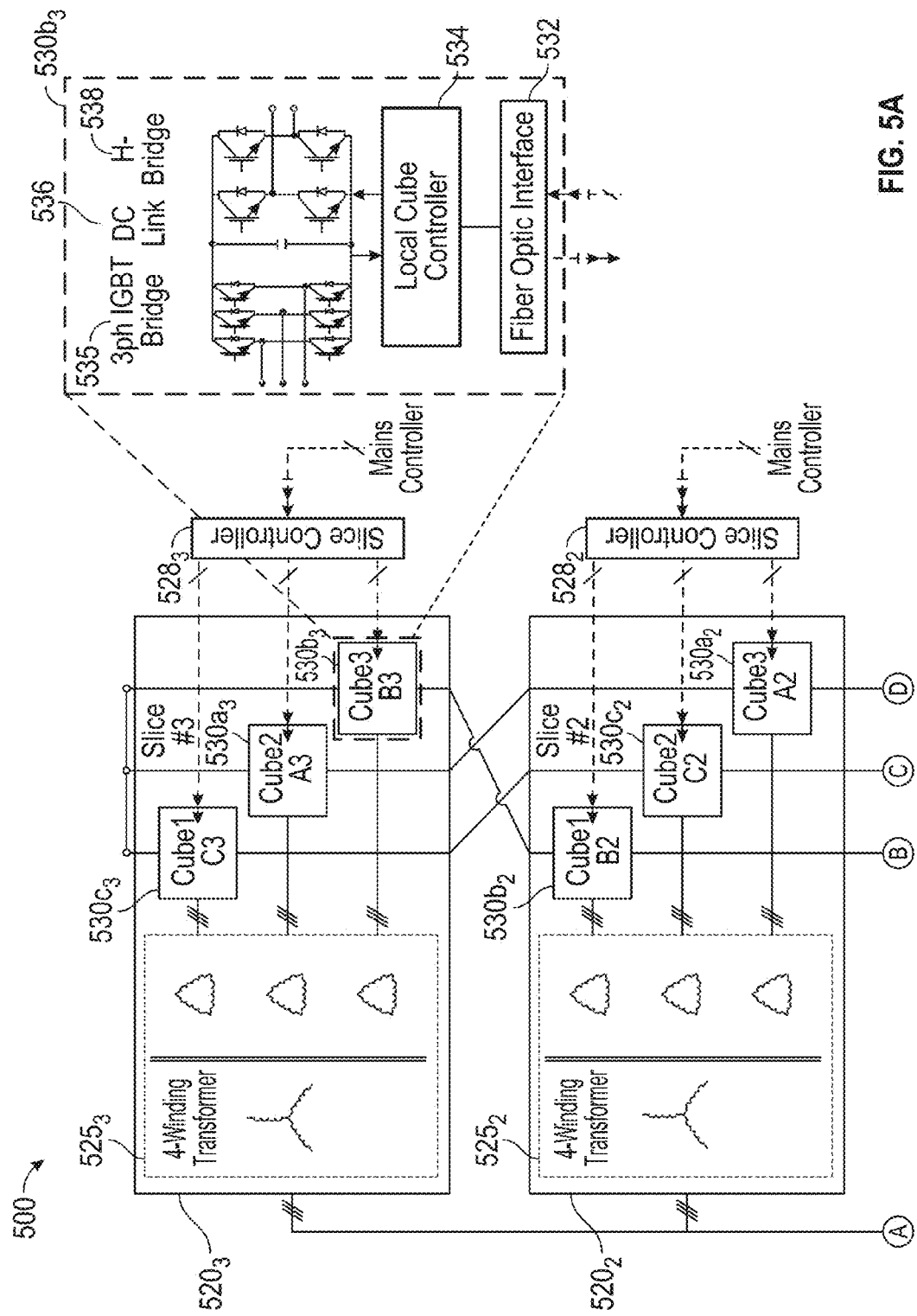
FIGS. 5A and 5B are schematic diagrams of a modular cascaded inverter in accordance with another embodiment of the present invention.
Figure 5B:
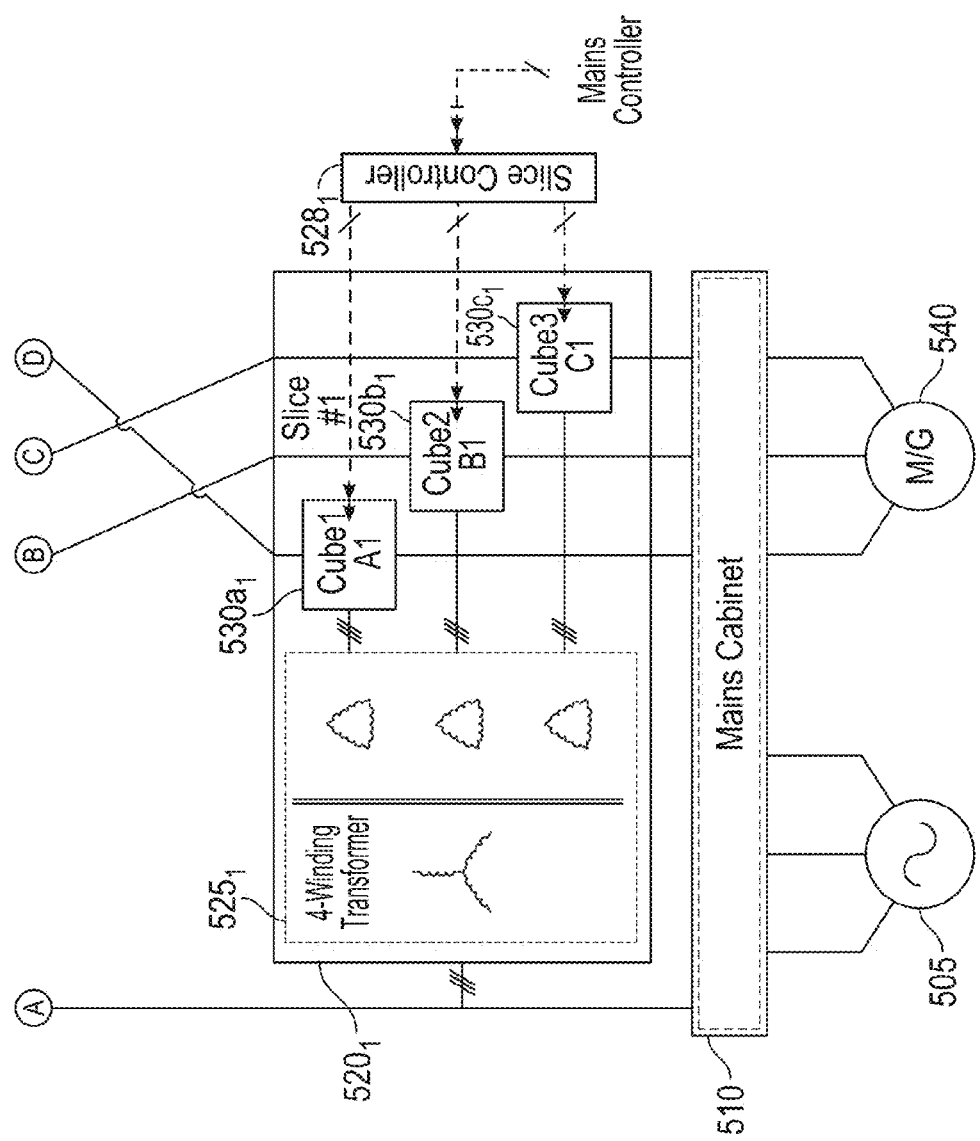

Embodiments are equally applicable to regenerative type inverters where the power flow is bi-directional, as shown in FIGS. 5A and 5B. Referring now to FIGS. 5A and 5B, shown are schematic diagrams of a modular cascaded regenerative power converter 500 in accordance with an embodiment. Like numerals in FIGS. 5A and 5B (i.e., having same least significant digits as in FIGS. 4A and 4B but having a most significant digit "5") are used to refer to like components.

As such, the only distinction between the embodiments of FIGS. 4A-4B and FIGS. 5A-5B are the different types of transformers and that power cells 530 are regenerative cells having active front end stages 535 (as in FIGS. 2A and 2B). Note however that the phase rotation control performed by slice controllers 528 may be the same as discussed above in FIGS. 4A and 4B.

Figure 6:
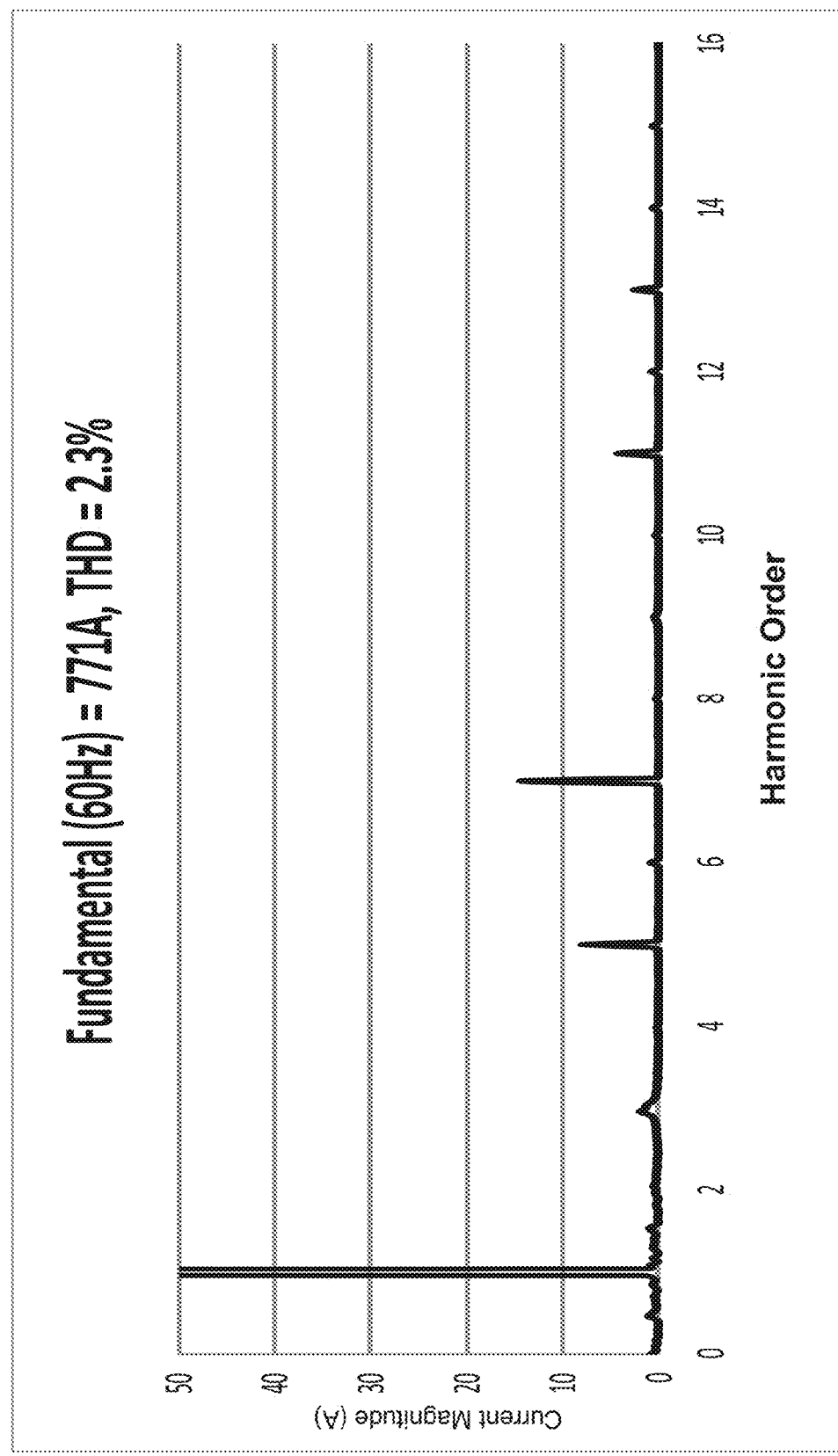
FIG. 6 is a graphical illustration of harmonic distortion in an inverter in accordance with an embodiment.
Figure 7A:
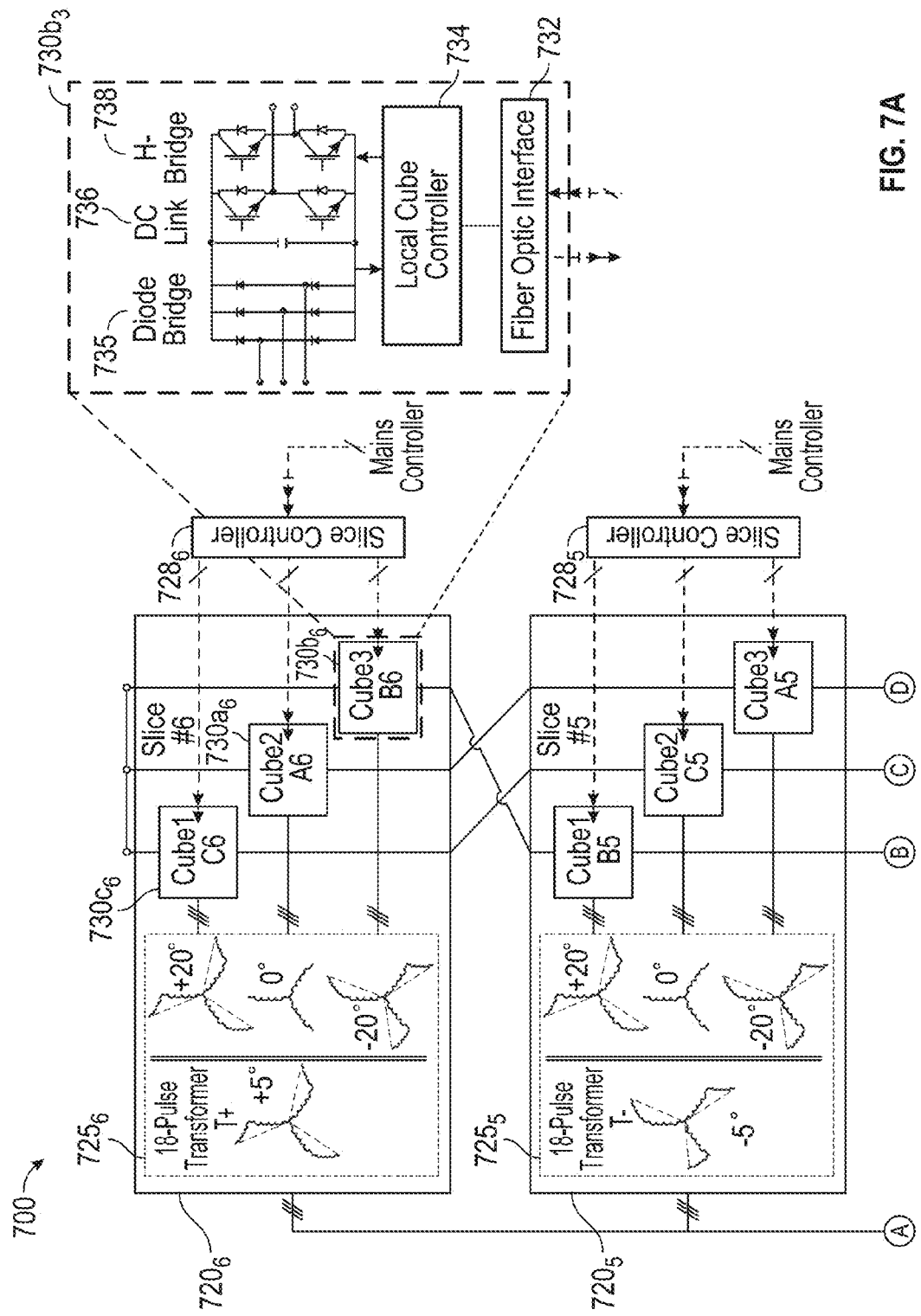
FIGS. 7A-7D are schematic diagrams of a modular cascaded inverter in accordance with yet another embodiment of the present invention.
Figure 7B:
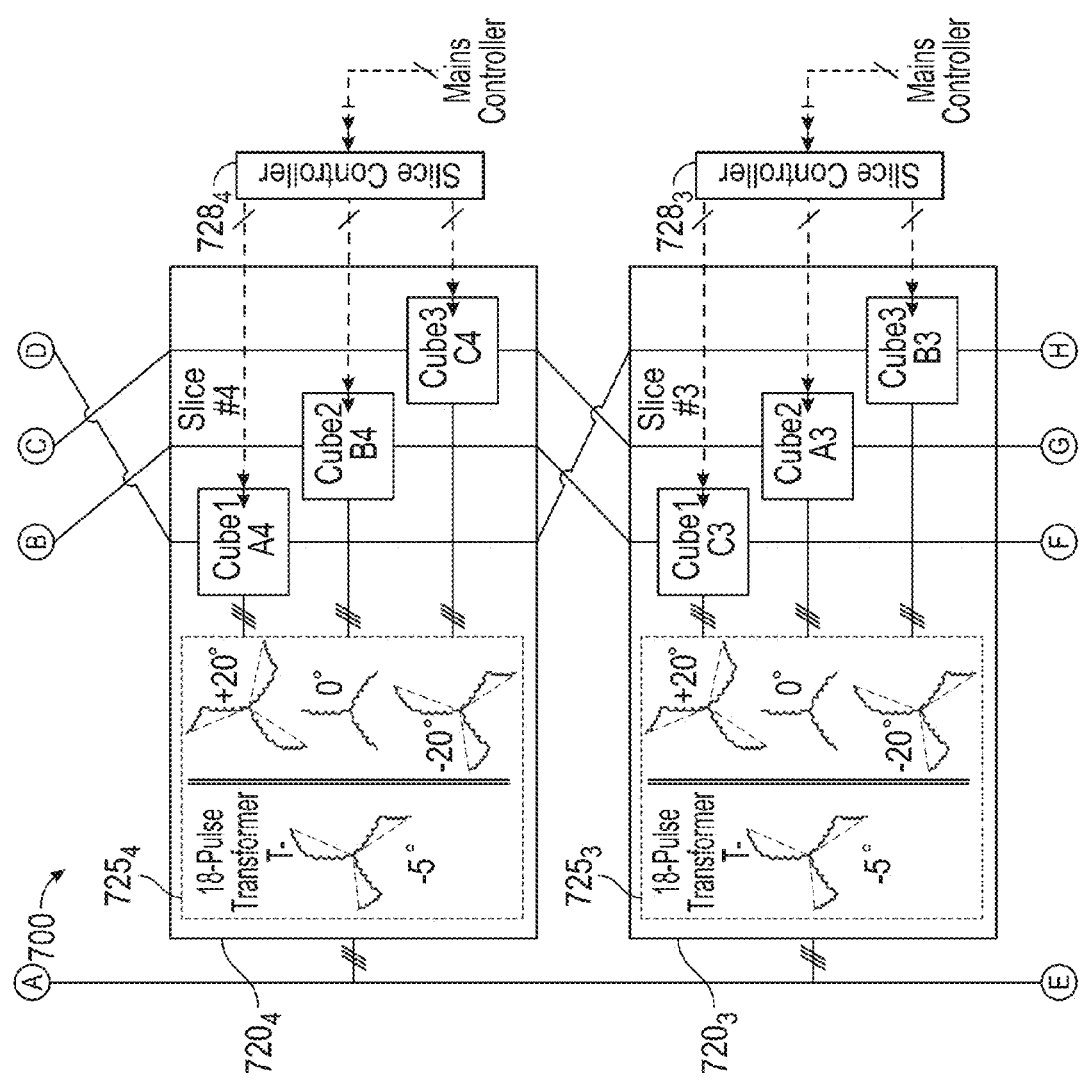
Figure 7C:
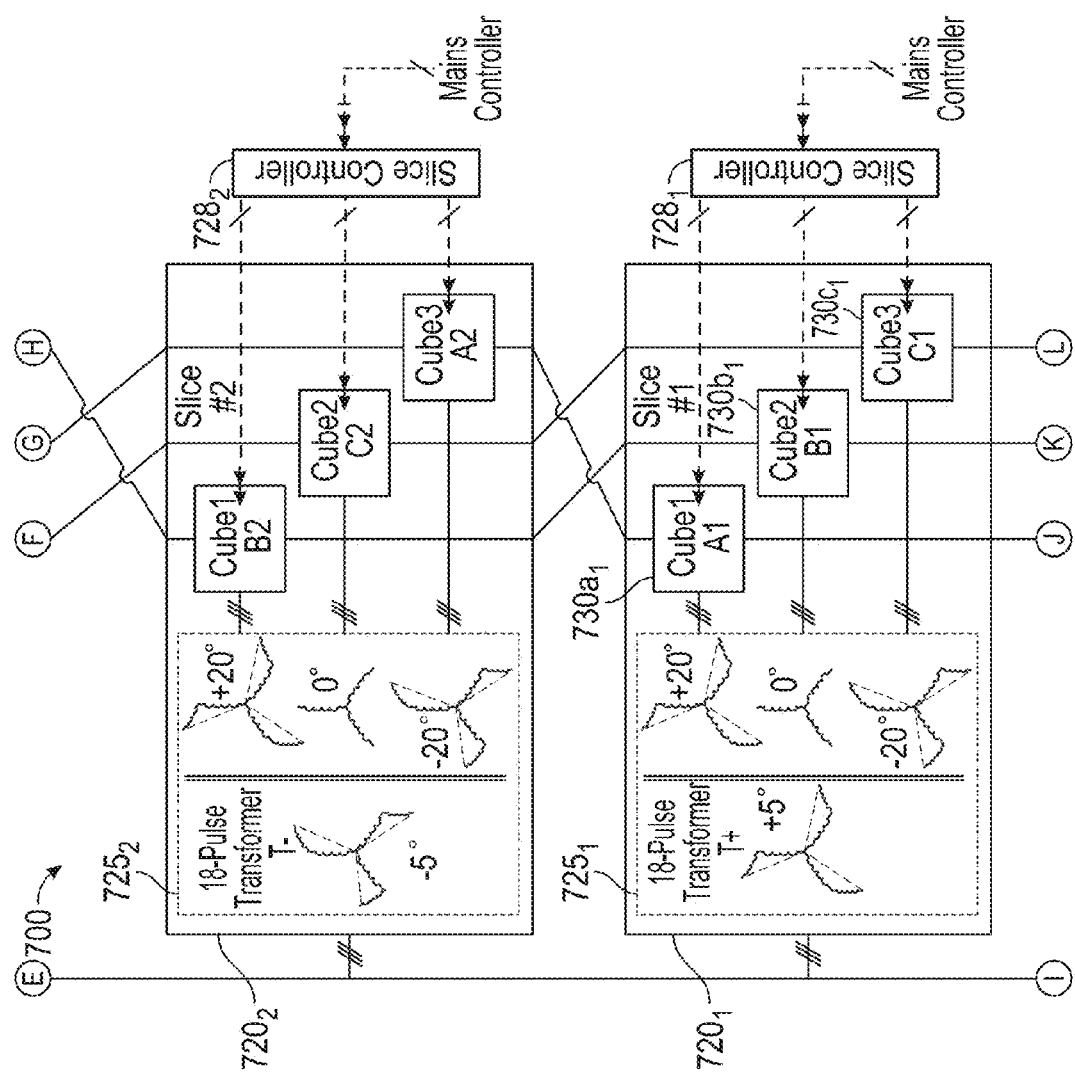
Figure 7D:
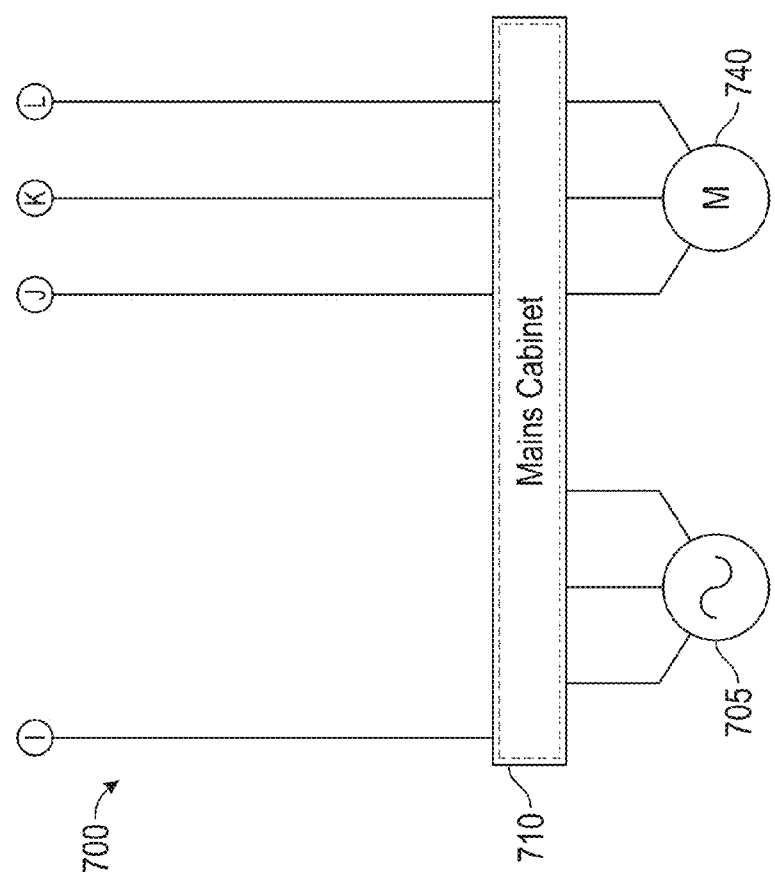

Test results on a 5000 HP system show significant reduction in input harmonics using an embodiment of the present invention. FIG. 6 shows the harmonic spectrum of input current after output phase rotation. THD of the input current may be improved from 5.86% to 2.3%, as compared to that shown in FIG. 3 in this example.

Embodiments can be used in many other drive system configurations, including configurations having more than 3 slices and configurations with multiple driver systems connected in parallel. Understand further that embodiments may be used in a modular drive system having a slice count that is a non-multiple of 3, where the phase rotation techniques described herein can provide significant harmonic reduction.

Referring now to FIGS. 7A-7D, shown are schematic diagrams of a modular cascaded regenerative power converter 700 in accordance with an embodiment. Like numerals in FIGS. 7A-7D (i.e., having same least significant digits as in FIGS. 4A and 4B but having a most significant digit "7") are used to refer to like components.

In FIGS. 7A-7D, a modular CHB inverter having 6 slices $720_1$-$720_6$ is provided, with corresponding slice controllers 728, transformers 725 and power cells 730. Note that phase rotation may continue to proceed, such that power cells $730_{A1}$-$730_{A6}$ couple to a first phase output line (phase A), power cells $730_{B1}$-$730_{B6}$ couple to a second phase output line (phase B), and power cells $730_{C1}$-$730_{C6}$ couple to a third phase output line (phase C). To couple the power cells of additional slices $720_4$-$720_6$ to the phase output lines, the same phase rotation as applied by the slice controllers of slices $720_1$-$720_3$ may be applied by the slice controllers of slices $720_4$-$720_6$. As such, 120° phase rotation between the slices continues.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a plurality of slices each having a transformer including a primary winding to couple to an input power source and a plurality of secondary windings each to couple to one of a plurality of power cells of the slice, each of the plurality of power cells of a first slice having an output that is phase rotated with respect to a correspondingly positioned power cell of a second slice; and a first phase output line having at least a first power cell of the first slice directly connected in series to a second power cell of the second slice, wherein the second power cell of the second slice is not correspondingly positioned horizontally or vertically with the first power cell of the first slice.

2. The system of claim 1, wherein a first transformer of the first slice has a first phase-shifted secondary winding coupled to the first power cell and a second transformer of the second slice has a second phase-shifted secondary winding coupled to the second power cell.

3. The system of claim 1, wherein the first phase output line has a third power cell of a third slice directly connected in series to at least the second power cell of the second slice, wherein the third power cell of the third slice is not correspondingly positioned with the first power cell of the first slice and the second power cell of the second slice.

4. The system of claim 1, wherein the transformer of each of the plurality of slices includes at least one primary winding and a plurality of secondary windings, wherein the at least one primary winding of each of the transformers is phase shifted with respect to its neighboring transformers, and the plurality of secondary windings are phase shifted with respect to the other secondary windings of the corresponding transformer.

5. The system of claim 1, wherein the plurality of power cells of at least some of the plurality of slices comprises an active front end stage.

6. The system of claim 1, further comprising a plurality of slice controllers each associated with one of the plurality of slices, the plurality of slice controllers to translate reference commands from a mains controller to create reference signals for the corresponding slice.

7. The system of claim 6, wherein at least some of the plurality of slice controllers are to electronically phase shift the reference signals to the plurality of power cells of the slice, to enable output phase rotation.

8. The system of claim 7, wherein a first slice controller is to output phase reference signals to the plurality of power cells of the first slice rotated by 120°, wherein the first power cell of the first slice and a first power cell of the second slice are phase rotated by 120° for harmonic cancellation.

9. The system of claim 8, wherein the slice controller is to perform the electrical rotation.

10. The system of claim 6, further comprising a plurality of physical power cable connections to couple power cells of the plurality of slices in accordance with electronic phase rotation performed by the plurality of slice controllers.

11. The system of claim 1, wherein the system comprises one of a non-regenerative modular power inverter or a regenerative modular power inverter.

12. The system of claim 1, wherein at least some of the plurality of power cells comprises a front end stage, a DC link and a H-bridge inverter.

13. The system of claim 1, wherein the plurality of slices is a non-multiple of three.

14. A drive system comprising:
a first slice having a first transformer, a first slice controller, and first, second, and third power cells, wherein the first power cell is to receive reference signals from the first slice controller at a first phase, the second power cell is to receive reference signals from the first slice controller at a second phase, and the third power cell is to receive reference signals from the first slice controller at a third phase;
a second slice having a second transformer, a second slice controller, and first, second, and third power cells, wherein the first power cell of the second slice is positioned in correspondence with the first power cell of the first slice, the second power cell of the second slice is positioned in correspondence with the second power cell of the first slice, and the third power cell of the second slice is positioned in correspondence with the third power cell of the first slice, and the first power cell of the second slice is to receive reference signals from the second slice controller at the second phase, the second power cell of the second slice is to receive reference signals from the second slice controller at the third phase, and the third power cell of the second slice is to receive reference signals from the second slice controller at the first phase;
a first phase output line to directly connect the first power cell of the first slice and the third power cell of the second slice and to couple the first power cell of the first slice and the third power cell of the second slice to a load;
a second phase output line to directly connect the second power cell of the first slice and the first power cell of the second slice and to couple the second power cell of the first slice and the first power cell of the second slice to the load; and
a third phase output line to directly connect the third power cell of the first slice and the second power cell of the second slice and to couple the third power cell of the first slice and the second power cell of the second slice to the load.

15. The drive system of claim 14, further comprising:
a third slice having a third transformer, a third slice controller, and first, second, and third power cells, wherein the first power cell of the third slice is positioned in correspondence with the first power cells of the first and second slices, the second power cell of the third slice is positioned in correspondence with the second power cells of the first and second slices, and the third power cell of the third slice is positioned in correspondence with the third power cells of the first and second slices, and the first power cell of the third slice is to receive reference signals from the third slice controller at the third phase, the second power cell of the third slice is to receive reference signals from the third slice controller at the first phase, and the third power cell of the third slice is to receive reference signals from the third slice controller at the second phase.

16. The drive system of claim 15, wherein:
the first phase output line is further to couple the second power cell of the third slice to the load;
the second phase output line to couple the third power cell of the third slice to the load; and
the third phase output line to couple the first power cell of the third slice to the load.

17. A method comprising:
receiving first reference signals from a first controller of a drive system in a first slice controller of a first slice having a first transformer and first, second, and third power cells, generating first, second and third pulse width modulation (PWM) reference signals therefrom, and providing the first PWM reference signal to the first power cell at a first phase, providing the second PWM reference signal to the second power cell at a second phase, and providing the third PWM reference signal to the third power cell at a third phase;
receiving second reference signals from the first controller in a second slice controller of a second slice having a second transformer and first, second, and third power cells, generating first, second and third PWM reference signals therefrom, and providing the first PWM reference signal to the first power cell of the second slice at the second phase, providing the second PWM reference signal to the second power cell of the second slice at the third phase, and providing the third PWM signal to the third power cell of the second slice at the first phase, wherein the first power cell of the second slice is positioned in correspondence with the first power cell of the first slice, the second power cell of the second slice is positioned in correspondence with the second power cell of the first slice, and the third power cell of the second slice is positioned in correspondence with the third power cell of the first slice; and directly connecting, via a first phase output line, the first power cell of the first slice and the third power cell of the second slice and coupling the first power cell of the first slice and the third power cell of the second slice to a load, directly connecting, via a second phase output line, the second power cell of the first slice and the first power cell of the second slice and coupling the second power cell of the first slice and the first power cell of the second slice to the load, and directly connecting, via a third phase output line, the third power cell of the first slice and the second power cell of the second slice and coupling the third power cell of the first slice and the second power cell of the second slice to the load.

18. The method of claim 17, further comprising:

receiving third reference signals from the first controller in a third slice controller of a third slice having a third transformer and first, second, and third power cells, generating first, second and third PWM reference signals therefrom, and providing the first PWM reference signal to the first power cell of the third slice at the third phase, providing the second PWM reference signal to the second power cell of the third slice at the first phase, and providing the third PWM reference signal to the third power cell of the third slice at the second phase, wherein the first power cell of the third slice is positioned in correspondence with the first power cells of the first and second slices, the second power cell of the third slice is positioned in correspondence with the second power cells of the first and second slices, and the third power cell of the third slice is positioned in correspondence with the third power cells of the first and second slices.

19. The method of claim 18, further comprising:

coupling, via the first phase output line, the second power cell of the third slice to the load;

coupling, via the second phase output line, the third power cell of the third slice to the load; and coupling, via the third phase output line, the first power cell of the third slice to the load.

\* \* \* \* \*